United States Patent
Rossi et al.

(10) Patent No.: US 10,384,384 B2
(45) Date of Patent: *Aug. 20, 2019

(54) NOZZLE TERMINAL FOR INJECTORS OF PLASTIC MATERIAL INJECTION MOULDING APPARATUS

(71) Applicant: INGLASS S.p.A., San Polo di Piave (Treviso) (IT)

(72) Inventors: Massimo Rossi, San Polo di Piave (IT); Massimo Bisetto, San Polo di Piave (IT); Fabio Bordignon, San Polo di Piave (IT)

(73) Assignee: INGLASS S.p.A., San Polo di Piave (Treviso) (IT)

( * ) Notice: Subject to any disclaimer, the term of this patent is extended or adjusted under 35 U.S.C. 154(b) by 232 days.

This patent is subject to a terminal disclaimer.

(21) Appl. No.: 15/230,548

(22) Filed: Aug. 8, 2016

(65) Prior Publication Data

US 2017/0043517 A1 Feb. 16, 2017

(30) Foreign Application Priority Data

Aug. 14, 2015 (IT) .......................... 102015000044745

(51) Int. Cl.
*B29C 45/27* (2006.01)
*B29C 45/20* (2006.01)

(52) U.S. Cl.
CPC ............ *B29C 45/278* (2013.01); *B29C 45/20* (2013.01); *B29C 2045/2785* (2013.01); *B29C 2045/2787* (2013.01); *B29K 2905/00* (2013.01)

(58) Field of Classification Search
CPC .................. B29C 45/20; B29C 45/278; B29C 2045/2785; B29C 2045/2787;
(Continued)

(56) References Cited

U.S. PATENT DOCUMENTS 5,299,928 A * 4/1994 Gellert .................. B29C 45/278
264/328.15
5,879,727 A * 3/1999 Puri ........................ B29C 45/27
264/328.15

(Continued)

FOREIGN PATENT DOCUMENTS

| CN | 201067963 | 6/2008 |
|----|-----------|--------|
| EP | 0755766 A1 | 1/1997 |
| FR | 3012992 A | 5/2015 |

OTHER PUBLICATIONS

Search Report dated Apr. 15, 2016 for Italian Patent Application No. 102015000044745, 7 pages.
(Continued)

*Primary Examiner* — Joseph S Del Sole
*Assistant Examiner* — Mohamed K Ahmed Ali
(74) *Attorney, Agent, or Firm* — RMCK Law Group PLC

(57) ABSTRACT

A nozzle terminal for injectors of plastic material injection molding apparatus, includes an inner tubular body or tip and a ring nut. The tip includes a radially inner element made of a first material and a radially outer element made of a second material arranged at contact with the radially inner element at an intermediate portion thereof terminating at a distance from the distal end thereof. The ring nut fully covers the radially outer element, insulating it from the environment.

15 Claims, 4 Drawing Sheets

(58) Field of Classification Search
CPC ..... B29C 45/23; B29C 45/27; B29C 45/2806; B29L 2031/30
See application file for complete search history.

(56) References Cited

U.S. PATENT DOCUMENTS

| | | | |
|---|---|---|---|
| 7,182,591 B2 * | 2/2007 | Babin | B29C 45/278 264/328.15 |
| 2002/0009516 A1 | 1/2002 | Jenko | |
| 2009/0148550 A1 | 6/2009 | Mohammed | |
| 2013/0306686 A1 | 11/2013 | Manner | |

OTHER PUBLICATIONS

Chinese Office Action dated May 24, 2018 for Chinese Application No. 201610659839.5. 6 pages.

* cited by examiner

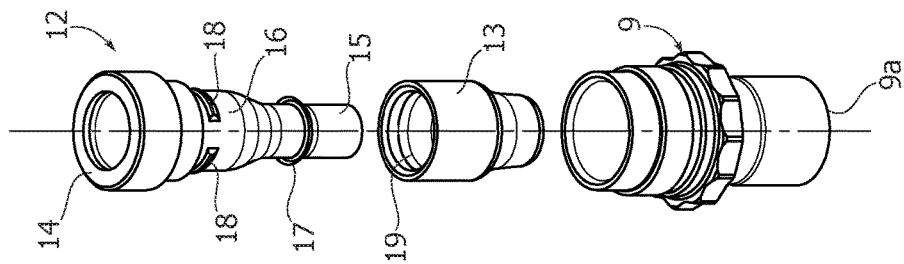
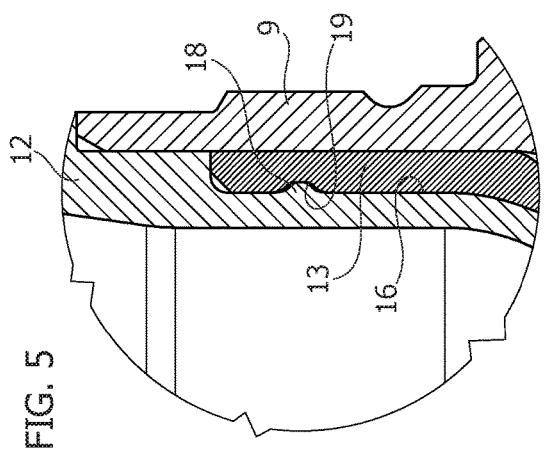
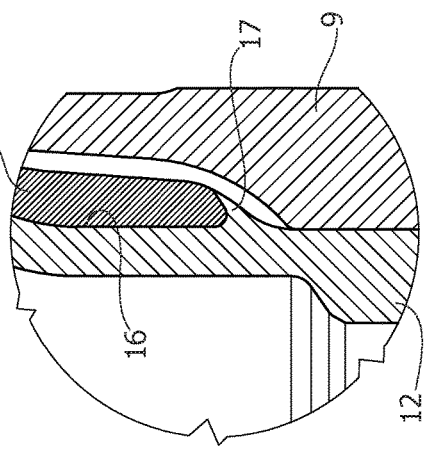
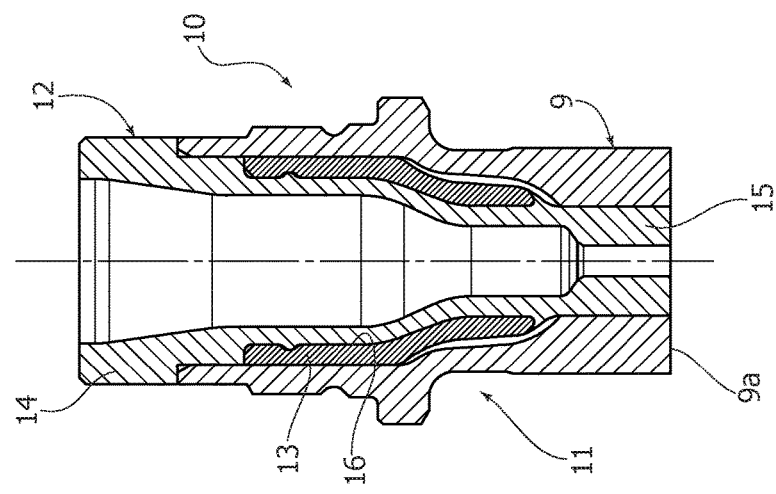

NOZZLE TERMINAL FOR INJECTORS OF PLASTIC MATERIAL INJECTION MOULDING APPARATUS

CROSS REFERENCE TO RELATED APPLICATIONS

This application claims priority to Italian Patent Application No. 102015000044745 filed on Aug. 14, 2015, the entire disclosure of which is incorporated herein by reference.

FIELD OF THE INVENTION

The present invention generally refers to injectors for plastic material injection moulding apparatus. More in particular, the invention regards a nozzle terminal for injectors thus made, comprising an inner tubular body or tip that defines a flow passage for the injected plastic material, and a ring nut externally and coaxially fixed to the tip.

STATE OF THE PRIOR ART

Nozzle terminals of this type are for example known from documents U.S. Pat. Nos. 5,299,928, 6,988,883 and WO-2006/123237. Typically, the inner tubular body or tip is made of a high thermal conductivity material while the outer ring nut, intended to be at contact with a cooled mould in use, is made of low thermal conductivity material so as to reduce loss of heat.

The need to guarantee the high thermal conductivity of the tip limits—as regards the composition thereof—the choice to materials, such as copper and its alloys for example, that on the other hand may have low resistance to abrasion and chemical agents of the plastic materials that traverse it during injection.

Document U.S. Pat. No. 7,182,591 also discloses a nozzle terminal of the type defined above, whose tip is made up of two axial portions, soldered to each other, respectively corresponding to the proximal end and distal end of the tip. Both portions are made of the same high thermal conductivity material, thus not even thus configuration is capable of resolving the technical problem outlined above.

Documents EP-0755766A1, FR-3012992A1 and US-2013/306686A1 disclose nozzle terminals without a ring nut and in which the tip is formed by a body made of high resistance material obtained with an annular interspace into which an insert made of high thermal conductivity material is arranged.

Document US-2009/148550 describes a nozzle terminal corresponding to the pre-characterising part of claim 1, whose tip includes a radially inner element made of a first high resistance material, for example steel, and a radially outer element or jacket made of a second high thermal conductivity material, for example copper, arranged at contact with a substantial axial portion of the radially inner element, up to the distal end thereof. The radially inner and outer elements of the tip are mutually coupled through different systems but none of them is capable of guaranteeing mutual stable fixing—both axial and angular—while simultaneously guaranteeing easy disassembly during maintenance operations. In addition, the jacket made of high thermal conductivity material is partly exposed outside the tip and it is subject—during use—to risks related to infiltration of the plastic material and corrosion by the gases generated during moulding, which may jeopardise the regular operation of the tip in its entirety.

SUMMARY OF THE INVENTION

The object of the present invention is to provide an efficient and functional solution to the aforementioned problem. This object is attained thanks to a nozzle terminal of the type defined above, whose main characteristic lies in the fact that the radially outer element of the tip is arranged at an intermediate portion of the radially inner element terminating at a distance from the distal end thereof and exposed towards the ring nut.

According to a first advantageous embodiment, the ring nut is of the "pass through" type and it fully covers the radially outer element of the tip thus insulating it from the environment, and the distal end of the radially inner element of the tip extends up to the corresponding distal end of said ring nut.

Due to this solution, the radially outer element of the tip is efficiently shielded and protected against the surrounding corrosive environment during use.

In one variant, the ring nut is of the "outer" type, i.e. it does not extend up to the distal end of the tip. In this case, besides the advantage deriving from the reduction of the size of the gate mark on the moulded piece during use, the sealing regarding the mould gate is limited to just two elements: the tip and the mould plate.

Both embodiments ("pass through" or "outer" ring nut) allow obtaining major functional advantages as concerns the improvement of plastic material colour change, due to lower stagnation of material and an improved thermal profile due to greater heat in proximity of the mould gate.

The radially outer element of the tip is advantageously mechanically coupled with the radially inner element.

Thanks to this solution idea, the radially outer element of the tip is insulated against the flow of the plastic material and against gases generated during moulding, and thus it is efficiently protected avoiding the risks of the tip malfunctioning.

In addition, as regards each of the two radially inner and radially outer elements, the most suitable respective materials, and the combination thereof, can be selected as a function of the characteristics of the plastic material to be moulded, the type of mould and the configuration of the nozzle terminal.

With the aim of increasing the thermal conduction efficiency, the coupling between the radially inner element, the radially outer element and the ring nut is conveniently obtained by interference, thus also reducing the risk that the radially outer element detaching from the radially inner element during injector maintenance operations, for example following the removal of the ring nut.

BRIEF DESCRIPTION OF THE DRAWINGS

The invention will now be described in detail, purely by way of non-limiting example, with reference to the attached drawings, wherein:

FIG. 4 is a view analogous to FIG. 3, showing the tip-ring nut assembly of the nozzle of FIG. 3 alone, FIGS. 5 and 6 show two enlarged details of FIG. 4, FIG. 7 is an exploded perspective view and in small scale of the tip-ring nut assembly of FIG. 4, and FIGS. 8 and 9 are views analogous to FIGS. 3 and 4, representing a second embodiment of the nozzle terminal according to the invention.

DETAILED DESCRIPTION OF THE INVENTION

Figure 1:
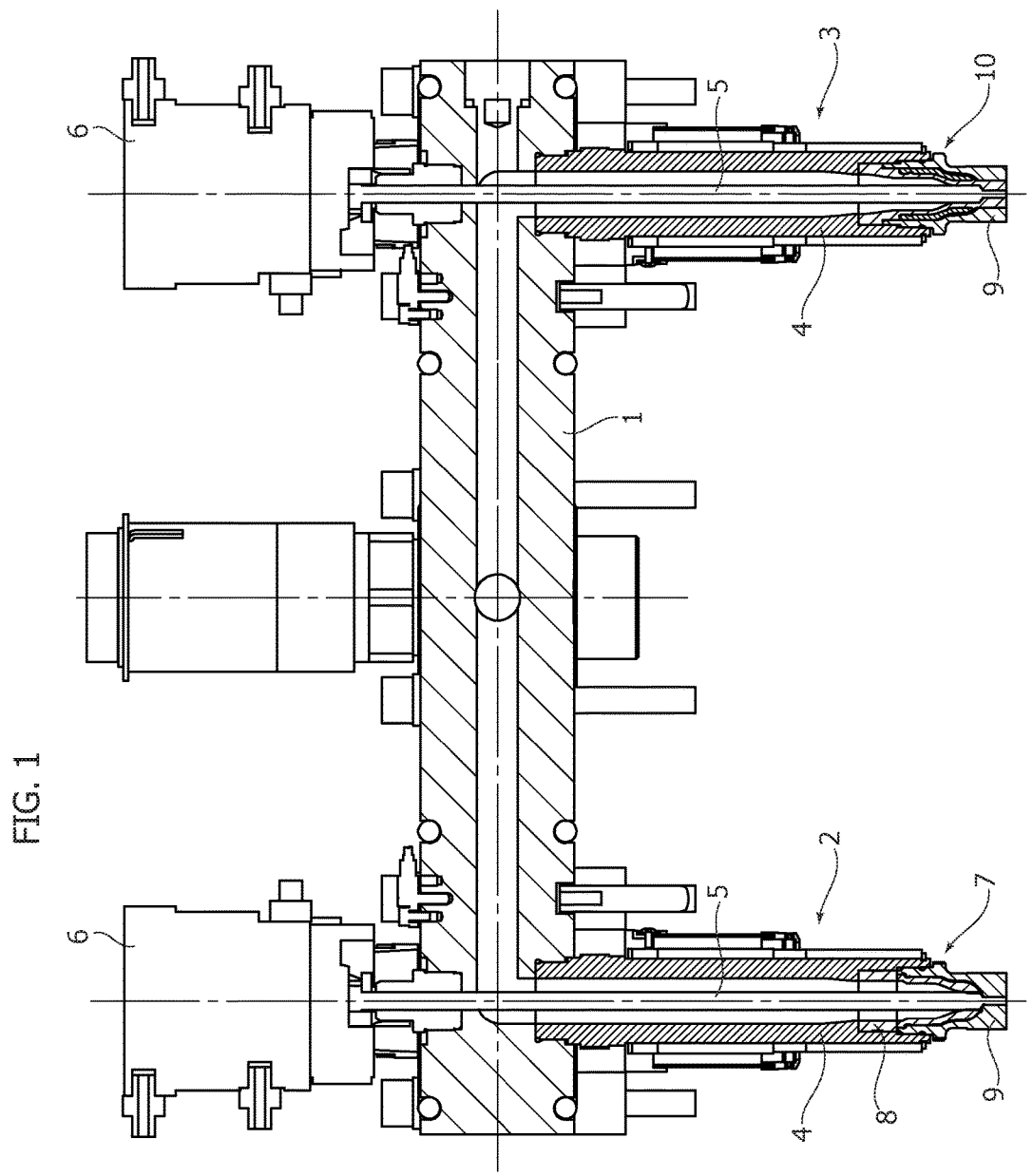
FIG. 1 is a schematic view and in partial vertical section of an injection moulding apparatus provided, by way of example, with two injectors with nozzle terminals respectively conventional and according to the invention.

Initially with reference to FIG. 1, a plastic material injection moulding apparatus, conventionally comprises a hot chamber 1 to which the pressurised plastic material to be injected in fluid state is supplied, through two injectors 2, 3—of the cylindrical pin valve type in this case—in the illustrated example. Still conventionally, each injector 2, 3, comprises a nozzle body 4, in communication with the hot chamber 1 and along which a pin valve 5 controlled by means of a fluid or electrical actuator 6 is axially mobile.

The lower end of the pin valve 5 cooperates with a nozzle terminal, to be addressed further hereinafter, to open or close the flow of the plastic material towards the injection passage ("gate") of a mould.

Figure 2:
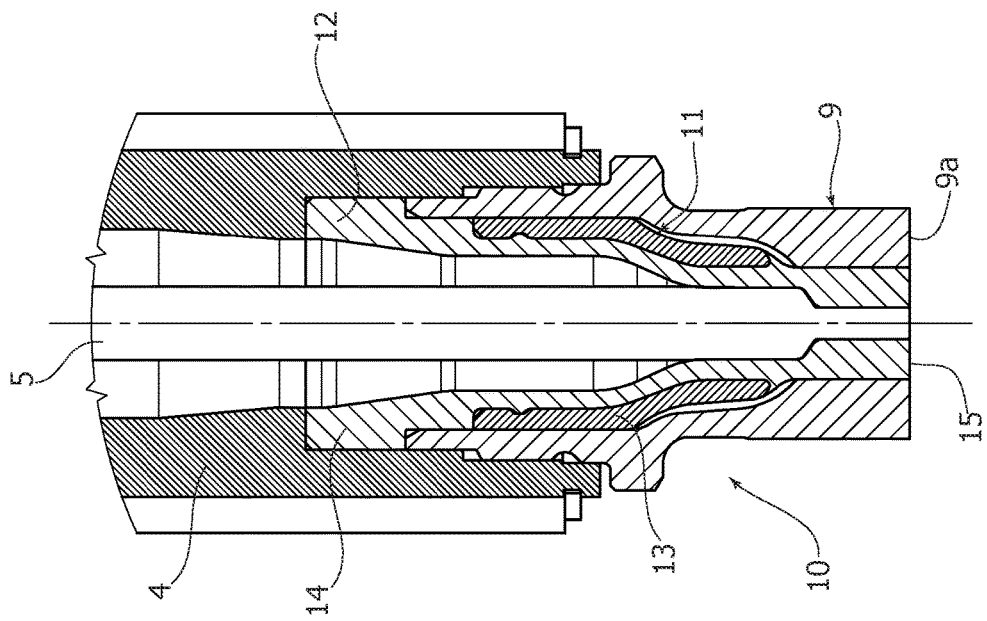
FIG. 2 is partial view, and in larger scale, of the conventional nozzle terminal.
Figure 3:
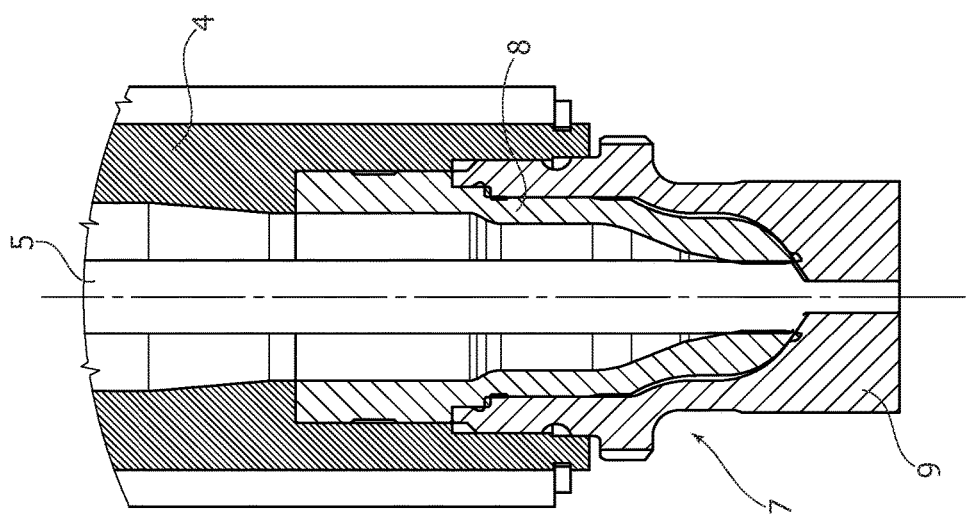
FIG. 3 is a view analogous to FIG. 2, exemplifying the first embodiment of the nozzle terminal according to the invention.

The injector 2 is provided with a conventional nozzle terminal, i.e. according to the prior art, indicated with reference n° 7 and illustrated further in detail in FIG. 2. It comprises an inner tubular body 8, called tip and formed by a single piece made of high thermal conductivity material (typically copper or its alloys), and a hollow element 9, made of a lower thermal conductivity material, called ring nut. The ring nut 9 projects beneath the tip 8 for sealing coupling, at the free end thereof, with a mould at the relative injection passage in a configuration referred to as "pass through end ring", i.e. wherein the ring nut 9 projects in the figure of the mould.

The injector 3 represented on the right part of FIG. 1 is instead provided with a nozzle terminal, according to a first embodiment of the invention, indicated in its entirety with 10 and represented further in detail in FIGS. 3 to 7. Even in this case, it comprises the ring nut 9, of the "pass through" type and substantially analogous to that according to the prior art, and an inner tubular body or tip indicated with 11, which is instead formed by two distinct components i.e. separated arranged in a peculiar fashion. The first component consists in a radially inner element 12 made of a first material, and the second element consists in a radially outer element or jacket 13 made of a second material usually different from the first.

The radially inner element 12 has a proximal end 14, inserted and locked in the nozzle 4, and a distal end 15 which projects outside the nozzle 4 and with which the lower end of the pin valve 5 cooperates. It narrows internally from the proximal end 14 to the distal end 15, which extends axially up to the corresponding end of the ring nut 9, indicated with 9a, substantially flushed with respect thereto.

The parts of the radially inner element 12 corresponding to the proximal end 14 and to the distal end 15 typically have a greater thickness, while the intermediate portion preferably has a smaller thickness and defines an outer annular peripheral recess 16 terminating at a distance from the distal end 15 and exposed towards the ring nut 9. The radially outer element 13 is housed and lodged in such recess 16. It should be observed that such recess 16 is not strictly necessary, given that it is only necessary that the radially outer element 13 be arranged at a median portion of the radially inner element 12 exposed towards the ring nut 9.

Thus, the radially outer element 13 surrounds and externally coaxially wraps the substantially central part of the radially inner element 12 located beneath the proximal end 14 thereof and above the distal end 15 thereof. Thus, whereas the radially inner element 12 is at contact with the flow of the plastic material introduced into the mould during the injection, the radially outer element 13 is never at contact. This allows obtaining the two elements 12 and 13 with different materials, which can be selected and combined as a function of the characteristics of the plastic material to be injected, the type of mould "gate" and the configuration of the nozzle terminal 11: of the pin valve type, like in the illustrated example, or of the free or torpedo flow type.

Thus, the radially inner element 12 required to resist against wear and oxidation caused by the plastic material, will be made of a first material with high mechanical resistance, high resistance against abrasion and high resistance against chemical agents. Such first material may be selected from among tempered stainless steel, but with very low thermal conductivity (16 W/mK), or still with tempered stainless steel, with higher resistance against wear as well as greater thermal conductivity (32 W/mK), or with tungsten which offers an even higher conductivity, in the order of 80 W/mK, and hardness comprised between 49 and 51 HRC.

The radially outer element 13 will instead be obtained with a second material that can be selected from a wide range: with low thermal conductivity such as titanium (4 W/mK) or with higher conductivity such as steel (16-36 W/mK), tungsten (80 W/mK), copper and nickel alloys (60-140 W/mK), molybdenum alloys such as TZM (120 W/mK). However, the radially outer element 13 is preferably made of a high thermal conductivity material such as copper or copper and beryllium alloys (120-300 W/mK), aluminium (260 W/mK), electrolytic copper (300-390 W/mK) and even graphite (60-400 W/mK).

As previously mentioned, the choice and combination of the first and second material will be made as a function of the type of plastic material to be injected and the configuration of the injection "gate" point. For example, as regards the characteristics of the plastic material, crystalline materials usually reveal the drawback related to the so-called "cold cap", i.e. freezing at the injection point, which hinders moulding at times or requires raising the temperatures to resume operations. Thus, crystalline materials generally require a high temperature of the tip 11, and thus a very conductive material is preferable when it comes to the radially outer element 13.

An amorphous plastic material instead often behaves differently as a function of the type of configuration of the tip or gate. For example, in case of a nozzle with valve these amorphous materials require high temperature for a better flow and so as to avoid flashes, particularly in the case of direct injection in the figure, while in the case of free flow the temperature of the tip has to be low so as to avoid problems related to "stringing" (the formation of a plastic string which remains between the moulded piece and nozzle, with the mould open when removing the piece, which is difficult to remove fully and may remain trapped in the mould during the subsequent injection cycle) or "drooling" from the gate (i.e. the dripping of plastic material which leads to aesthetic defects on the moulded pieces near the "gate", or even prevents moulding due to the cooling of the drop thus occluding the gate).

The semi-crystalline plastic materials generally behave in an intermediate fashion.

The configuration of the ring nut 9 of the nozzle terminal 10 may also affect the behaviour of the plastic material on the mould gate: for example a pass through end ring subject of the figure like in the case of the example described up to now, may generally lead to a hotter gate with respect to an outer ring nut ("blind seat"), described hereinafter, given that in the latter the gate obtained on the mould is usually colder. The radially outer element 13 is at least partly at contact with the radially inner element 12 and the mutual coupling thereof is obtained both by interference and by means of a mechanical retention for example of the type illustrated further in detail in FIGS. 4-7. The annular recess 16 is delimited—on the distal end 15 side of the inner element 12—by a radial annular collar 17, and it has—on the opposite side—one or more projecting reliefs 18 for the engagement of corresponding inner cavities 19 of the radially outer element 13. Obviously the arrangement of teeth 18 and cavities 19 may be inverted.

The ring nut 9, distinct and separate from the tip 11, is typically obtained using a low conductivity material and thus more insulating such as titanium or steel with hardness in the order of 46-48 HRC, is coaxially fixed to the tip 11 surrounding and fully covering the radially outer element 13, so as to insulate it against the environment and protect it against corrosive gases which develop during the injection of the plastic material. Advantageously, the ring nut 9 is at least partly coupled with the radially inner element 12 and it is at least partly coupled with the radially outer element 13 of the tip 11. Preferably, the ring nut 9 is coupled, by interference, with portions of the radially inner element 12 respectively located upstream and downstream of the recess 17, and preferably it is also coupled with the radially outer element 13 by interference.

Figure 8:
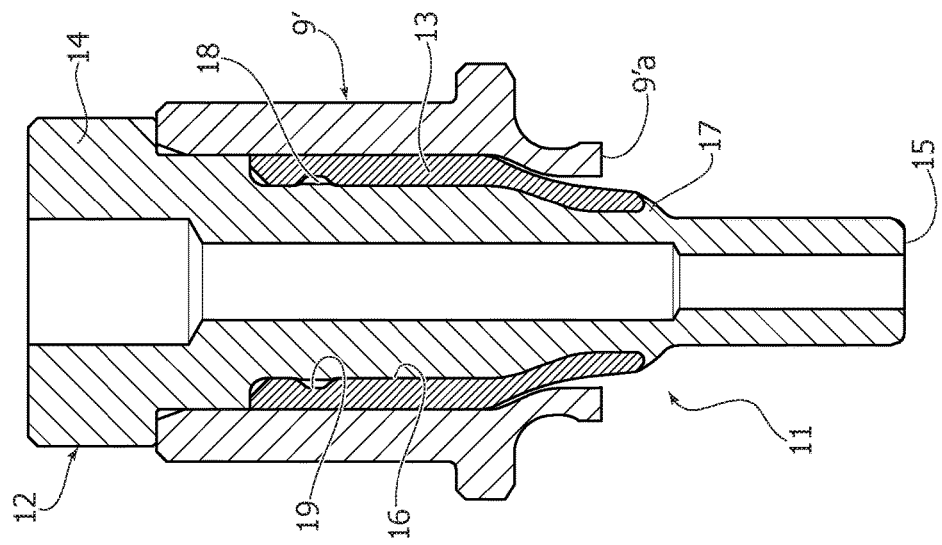
Figure 9:
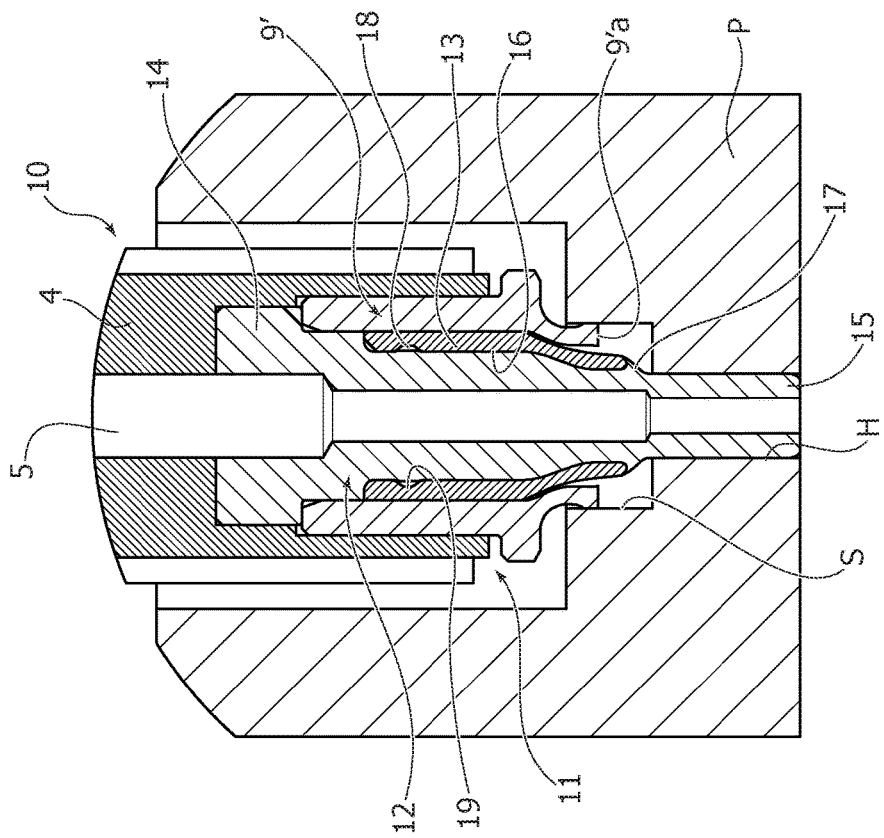

FIGS. 8 and 9, whose parts identical or similar to the ones described previously shall be indicated using the same reference numbers, illustrate a second embodiment of the nozzle terminal 10 according to the invention in which the ring nut, indicated with 9', is of the "outer" instead of the "pass through" type. In this case, the ring nut 9' terminates well before the distal end 15 of the radially inner element 12, thus only partly covering the latter, and the distal end 9' thereof is housed in a seat S of the plate P of the mould. The distal end 15 of the radially inner element 12 of the tip 11 extends through a hole H of the plate P of the mould having a considerably smaller diameter with respect tom the case of the "pass through" ring nut, with the advantage that the gate mark on the moulded piece will be considerably smaller, thus improving the aesthetic quality thereof. In addition, also the sealing between the nozzle terminal 10 and the injection passage (gate) of the mould is simplified in this case, in that it is limited to the distal end 15 of the radially inner element 12 inserted in the hole H. Even in this case, just like in the case of the previously described "pass through" ring nut 9, the outer ring nut 9' is at least partly coupled with the radially inner element 12, and it is at least partly coupled with the radially outer element 13.

Obviously, the construction details and the embodiments may widely vary with respect to what has been described and illustrated, without departing from the scope of protection of the present invention, as defined in the claims that follow.

The invention claimed is:

1. A nozzle terminal for injectors of plastic material injection moulding apparatus, comprising:
   an inner tubular body or tip defining a flow passage for the injected plastic material, and a ring nut fixed externally and coaxially to the tip,
   wherein the tip includes:
      a radially inner element made of a first material and having a proximal end and a distal end, the radially inner element defining a peripheral annular recess formed into an outer surface thereof, the annular recess having proximal and distal ends terminating at a distance from the respective proximal and distal ends of the radially inner element, and
      a radially outer element made of a second material arranged at contact with said radially inner element, the radially outer element being housed within the peripheral annular recess and being mechanically coupled therewith such that the radially outer element is arranged at an intermediate portion of the radially inner element terminating at a distance from the distal and proximal ends thereof and exposed towards the ring nut,
   wherein the ring nut is distinct from the tip and the radially outer element of the tip is an element distinct from the radially inner element, and
   wherein the distal end of said annular recess is formed by a radial annular collar of the radially inner element and the annular recess has, adjacent its proximal end, at least one projecting relief for engagement of a corresponding inner cavity of said radially outer element.

2. The nozzle terminal according to claim 1, wherein said ring nut fully covers said radially outer element insulating it from the environment.

3. The nozzle terminal according to claim 2, wherein said distal end of the radially inner element extends up to a corresponding distal end of said ring nut.

4. The nozzle terminal according to claim 1, said ring nut covers said radially outer element only partly.

5. The nozzle terminal according to claim 1, wherein said radially inner and radially outer elements are coupled to each other by interference.

6. The nozzle terminal according to claim 1, wherein said ring nut is coupled to said radially inner element by interference.

7. The nozzle terminal according to claim 1, wherein said ring nut is coupled to said radially outer element by interference.

8. The nozzle terminal according to claim 1, wherein said first material has high mechanical resistance, high resistance to abrasion and high resistance to chemical agents.

9. The nozzle terminal according to claim 8, wherein said first material is selected from among tempered stainless steel, anon-stainless steel and tungsten.

10. The nozzle terminal according claim 1, said second material is selected from among low or high thermal conductivity materials.

11. The nozzle terminal according to claim 9, wherein said second material is selected from among titanium, steel, copper, copper and beryllium alloys, copper and nickel alloys, aluminium and graphite.

12. The nozzle terminal according to claim 1, wherein said ring nut is at least partly coupled with said radially inner element.

13. The nozzle terminal according to claim 1, wherein said ring nut is at least partly coupled with said radially outer element.

14. The nozzle according to claim 3, wherein:
the proximal end of said radially inner element extends proximally beyond proximal ends of said radially outer element and said ring nut;
one side of the radially outer element contacts the radially inner element and an opposite side of the radially outer element contacts an inner surface of the ring nut; and
said radially outer element is positioned at the intermediate portion of the radially inner element and at an intermediate portion of said ring nut such that the proximal and distal ends of the radially outer element terminate before respective proximal and distal ends of both the radially inner element and the ring nut.

15. The nozzle according to claim 4, wherein:
the proximal end of said radially inner element extends proximally beyond proximal ends of said radially outer element and said ring nut;
one side of the radially outer element contacts the radially inner element and an opposite side of the radially outer element contacts an inner surface of the ring nut; and
said radially outer element is positioned at the intermediate portion of the radially inner element and relative to said ring nut such that a proximal end of the radially outer element terminates before a respective proximal ends of both the radially inner element and the ring nut, and the distal end of the radially outer element terminates beyond a distal end of the ring nut and before the distal end of the radially inner element.

\* \* \* \* \*